(12) United States Patent
Kawasaki et al.

(10) Patent No.: US 8,771,833 B2
(45) Date of Patent: Jul. 8, 2014

(54) LAMINATED POLYESTER FILM

(75) Inventors: Taishi Kawasaki, Shiga-ken (JP); Masato Fujita, Shiga-ken (JP)

(73) Assignee: Mitsubishi Plastics, Inc., Tokyo (JP)

( * ) Notice: Subject to any disclaimer, the term of this patent is extended or adjusted under 35 U.S.C. 154(b) by 159 days.

(21) Appl. No.: 13/320,995

(22) PCT Filed: May 24, 2010

(86) PCT No.: PCT/JP2010/058755
§ 371 (c)(1), (2), (4) Date: Jan. 12, 2012

(87) PCT Pub. No.: WO2010/137562
PCT Pub. Date: Dec. 2, 2010

(65) Prior Publication Data
US 2012/0121918 A1    May 17, 2012

(30) Foreign Application Priority Data

May 25, 2009   (JP) ................................ 2009-125043

(51) Int. Cl.
*B32B 27/36* (2006.01)
*B32B 27/40* (2006.01)

(52) U.S. Cl.
USPC ..................................... 428/423.7; 428/423.1

(58) Field of Classification Search
USPC .............................................. 428/480, 423.7
See application file for complete search history.

(56) References Cited

U.S. PATENT DOCUMENTS

| | | | |
|---|---|---|---|
| 6,921,580 B2 * | 7/2005 | Akatsu et al. ................. 428/480 |
| 7,531,238 B2 * | 5/2009 | Mizuno et al. ............. 428/423.5 |
| 2011/0051245 A1 * | 3/2011 | Masuda et al. ................ 359/584 |
| 2011/0054090 A1 * | 3/2011 | Fujita ............................. 524/120 |
| 2011/0189489 A1 * | 8/2011 | Kawasaki et al. ........... 428/423.7 |
| 2011/0212277 A1 * | 9/2011 | Masuda et al. .................. 428/1.1 |
| 2011/0262753 A1 * | 10/2011 | Kawasaki et al. .............. 428/412 |
| 2012/0094113 A1 * | 4/2012 | Kawasaki et al. ............. 428/336 |

FOREIGN PATENT DOCUMENTS

| | | | |
|---|---|---|---|
| JP | 2003049135 A | * | 2/2003 |
| JP | 2007-111923 | | 5/2007 |
| JP | 2007-130958 | | 5/2007 |
| JP | 2008-168487 | | 7/2008 |
| JP | 2008-179148 | | 8/2008 |
| JP | 2008-208223 | | 9/2008 |
| JP | 2009-84488 | | 4/2009 |
| JP | 2010-89308 | | 4/2010 |

OTHER PUBLICATIONS

Extended European Search Report in EP 10 78 0517 dated Mar. 19, 2013.
English language translation of the International Preliminary Report on Patentability and Written Opinion in PCT/JP2010/058755 dated Dec. 22, 2011.
International Search Report for PCT/JP2010/058755 mailed Jun. 15, 2010.

* cited by examiner

*Primary Examiner* — Thao T. Tran
(74) *Attorney, Agent, or Firm* — Nixon & Vanderhye P.C.

(57) ABSTRACT

The present invention provides a laminated polyester film which can be suitably used in the applications requiring good adhesion to a micro-lens layer, a prism layer or the like, for example, in a backlight unit for liquid crystal displays, etc. The laminated polyester film of the present invention comprises a polyester film, and a coating layer formed on at least one surface of the polyester film by applying a coating solution comprising a urethane resin, an epoxy compound, an oxazoline compound and a melamine compound thereonto.

20 Claims, No Drawings

LAMINATED POLYESTER FILM

This application is the U.S. national phase of International Application No. PCT/JP2010/058755 filed 24 May 2010 which designated the U.S. and claims priority to JP 2009-125043 filed 25 May 2009, the entire contents of each of which are hereby incorporated by reference.

TECHNICAL FIELD

The present invention relates to a laminated polyester film, and more particularly, to a laminated polyester film which is suitably used as a member for micro-lens or prism sheets used in a backlight unit of liquid crystal displays, etc., and has a good adhesion property to various functional layers.

BACKGROUND ART

In recent years, liquid crystal displays have been extensively used as a display device for TVs, personal computers, digital cameras, cellular phones, etc. The liquid crystal displays have no light-emitting function by themselves. Therefore, liquid crystal displays of such a type in which light is irradiated from a backside thereof using a backlight have now come to dominate.

As the backlight type liquid crystal displays, there are known those having a so-called edge light type structure or a so-called direct backlight type structure. With the recent tendency toward reduction in thickness of liquid crystal displays, the edge light type liquid crystal displays have been more frequently employed. The edge light type liquid crystal displays are generally constructed from a reflection sheet, a light guide plate, a light diffusion sheet and a prism sheet which are successively laminated in this order. The flow of light through such edge light type liquid crystal displays is designed such that the light entered from the backlight into the light guide plate is reflected on the reflection sheet and then emitted from the surface of the light guide plate. The light emitted from the light guide plate is entered into the light diffusion sheet, diffused therein and then emitted therefrom. The light emitted from the light diffusion sheet is then entered into the prism sheet disposed next to the light diffusion sheet. In the prism sheet, the light entered thereinto is converged in the normal direction and emitted therefrom toward the liquid crystal layer.

The prism sheet used in the above construction serves for improving an optical efficiency of the backlight and enhancing a brightness thereof. As a transparent base film for the prism sheet, there has been generally used a polyester film in view of a transparency and mechanical properties thereof. In general, an easy-bonding coating layer may be further provided as an intermediate layer between the polyester film as the base material and the prism layer in order to enhance adhesion therebetween. It is known that the easy-bonding coating layer is formed of, for example, a polyester resin, an acrylic resin or a urethane resin (Patent Documents 1 to 3).

The prism layer may be produced, for example, by the following method. That is, an active energy ray-curable coating material is charged into a prism mold, and then a polyester film is placed on the coating material thus charged so as to interpose the coating material between the polyester film and the mold. Next, an active energy ray is irradiated to the active energy ray-curable coating material to cure the resin, and then the mold is removed from the cured resin, thereby obtaining the prism layer formed on the polyester film. In such a method, in order to form an accurate prism pattern on the prism layer, it is required to use a solvent-free type active energy ray-curable coating material. However, the solvent-free type coating material tends to be deteriorated in penetration into an easy-bonding layer laminated on the polyester film and swelling effect therein as compared to a solvent type coating material and, therefore, tends to be insufficient in adhesion to the polyester film. In order to improve the adhesion property, a coating layer comprising a specific urethane resin has been proposed. However, even such a coating layer may still fail to exhibit a sufficient adhesion property to the solvent-free type coating material (Patent Document 4).

Recently, with the considerable reduction in price of liquid crystal displays, there is a demand for considerable reduction in costs required in steps for processing of micro-lens layers or prism layers. As an optimum method for achieving the reduction in costs, there may be mentioned the method using an increased processing speed. However, when merely increasing the processing speed, the amount of active energy rays irradiated tends to be reduced, so that adhesion between the micro-lens layer or prism layer and the polyester film tends to be lowered. In the method of increasing the amount of active energy rays irradiated while increasing the processing speed, there tends to occur increase in costs owing to introduction of lamps or increased amount of electric power consumed, and further there tends to arise such a problem that the polyester film suffers from curling, etc., owing to the heat generation.

PRIOR DOCUMENTS

Patent Documents

Patent Document 1: Japanese Patent Application Laid-Open (KOKAI) No. 8-281890
Patent Document 2: Japanese Patent Application Laid-Open (KOKAI) No. 11-286092
Patent Document 3: Japanese Patent Application Laid-Open (KOKAI) No. 2000-229395
Patent Document 4: Japanese Patent Application Laid-Open (KOKAI) No. 2-158633

SUMMARY OF THE INVENTION

Problems to be Solved by the Invention

The present invention has been accomplished to solve the above conventional problems. An object of the present invention is to provide a laminated polyester film which can exhibit a good adhesion property even though the amount of active energy rays irradiated is small, and can be suitably used, for example, as a member for micro-lens or prism sheets employed in a backlight unit for liquid crystal displays, etc.

Means for Solving Problems

As a result of the present inventors' earnest study in view of the above problems, it has been found that the above problems can be readily solved by using a laminated polyester film having a specific structure. The present invention has been attained on the basis of this finding.

That is, in an aspect of the present invention, there is provided a laminated polyester film comprising a polyester film, and a coating layer formed on at least one surface of the polyester film by applying a coating solution comprising a urethane resin, an epoxy compound, an oxazoline compound and a melamine compound thereonto.

Effect of the Invention

In accordance with the present invention, there can be provided a laminated polyester film which is excellent in adhesion property and a wet heat resistance when a microlens, a prism layer or the like is formed thereon. Therefore, the present invention has a high industrial value.

PREFERRED EMBODIMENTS FOR CARRYING OUT THE INVENTION

The present invention is described in more detail below.

The polyester film constituting the laminated polyester film of the present invention may have either a single layer structure or a multilayer structure. Unless departing from the scope of the present invention, the polyester film may have not only a two or three layer structure but also a four or more multilayer structure, and the layer structure of the polyester film is not particularly limited.

The polyester used in the present invention may be either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned one or more compounds selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the polyester, there may be mentioned one or more compounds selected from the group consisting of ethylene glycol, diethylene glycol, propylene glycol, butanediol, 4-cyclohexanedimethanol and neopentyl glycol.

For the main purposes of imparting an easy-slipping property to the film and preventing occurrence of flaws in the film, particles are preferably blended in the polyester layer in the film of the present invention. The kind of particles to be blended in the polyester layer is not particularly limited, and any particles may be used as long as the particles are capable of imparting a good easy-slipping property to the film. Specific examples of the particles include particles of silica, calcium carbonate, magnesium carbonate, barium carbonate, calcium sulfate, calcium phosphate, magnesium phosphate, kaolin, aluminum oxide, titanium oxide, etc. In addition, there may also be used heat-resistant organic particles as described in Japanese Patent Publication (KOKOKU) No. 59-5216, Japanese Patent Application Laid-Open (KOKAI) No. 59-217755 or the like. Examples of the other heat-resistant organic particles include particles of thermosetting urea resins, thermosetting phenol resins, thermosetting epoxy resins, benzoguanamine resins, etc. Further, there may also be used deposited particles obtained by precipitating and finely dispersing a part of metal compounds such as a catalyst during the process for production of the polyester.

On the other hand, the shape of the particles used in the polyester layer is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The average particle diameter of the particles used in the polyester layer is usually in the range of 0.01 to 3 μm and preferably 0.1 to 2 μm. When the average particle diameter of the particles is less than 0.01 μm, the particles may fail to impart an easy-slipping property to the polyester layer, or tend to be aggregated together and therefore exhibit a poor dispersibility therein, which will cause deterioration in transparency of the resulting film. On the other hand, when the average particle diameter of the particles is more than 3 μm, the obtained film tends to have an excessively coarse surface roughness, thereby causing problems in the subsequent steps upon forming a functional layer such as a prism layer and a light diffusion layer on the polyester layer.

The content of the particles in the polyester layer is usually in the range of 0.001 to 5% by weight and preferably 0.005 to 3% by weight. When the content of the particles in the polyester layer is less than 0.001% by weight, the resulting film tends to be insufficient in easy-slipping property. On the other hand, when the content of the particles in the polyester layer is more than 5% by weight, the resulting film tends to be insufficient in transparency.

The method of adding the particles to the polyester layer is not particularly limited, and any conventionally known methods can be suitably used therefor. For example, the particles may be added at any optional stages in the process for production of the polyester forming the respective layers. The particles are preferably added to the polyester after completion of the esterification reaction or transesterification reaction.

In addition, there may also be used the method of blending a slurry of the particles prepared by dispersing the particles in ethylene glycol or water with the raw polyester material using a vented kneading extruder, the method of blending the dried particles with the raw polyester material using a kneading extruder, or the like.

Meanwhile, the polyester film used in the present invention may also comprise, in addition to the above particles, known additives such as an antioxidant, an antistatic agent, an ultraviolet absorber, a thermal stabilizer, a lubricant, a dye, a pigment, etc., if required.

The thickness of the polyester film used in the present invention is not particularly limited, and the polyester film may have any thickness as long as it can maintain a suitable film shape. The thickness of the polyester film is usually in the range of 10 to 350 μm and preferably 50 to 250 μm.

Next, an example of the process of producing the polyester film used in the present invention is more specifically explained, although not particularly limited thereto. That is, in the production process, there is preferably used such a method in which the above-mentioned raw polyester material is extruded from a die in the form of a molten sheet, and the molten sheet is cooled and solidified on a cooling roll to obtain an unstretched sheet. In this case, in order to enhance a flatness of the obtained sheet, it is preferred to enhance adhesion between the sheet and the rotary cooling drum. For this purpose, an electrostatic adhesion method and/or a liquid coating adhesion method are preferably used. Next, the thus obtained unstretched sheet is biaxially stretched. In such a case, the unstretched sheet is first stretched in one direction thereof using a roll-type or tenter-type stretching machine. The stretching temperature is usually 70 to 120° C. and preferably 80 to 110° C., and the stretch ratio is usually 2.5 to 7 times and preferably 3.0 to 6 times. Next, the thus stretched film is stretched in the direction perpendicular to the stretching direction of the first stage. In this case, the stretching temperature is usually 70 to 170° C., and the stretch ratio is usually 3.0 to 7 times and preferably 3.5 to 6 times. Successively, the resulting biaxially stretched sheet is heat-treated at a temperature of 180 to 270° C. under a tension or relaxation within 30% to obtain a biaxially oriented film. Upon the above stretching steps, there may also be used the method in which the stretching in each direction is carried out in two or more stages. In such a case, the multi-stage stretching is preferably performed such that the stretch ratio in each of the two directions is finally fallen within the above-specified range.

Also, upon producing the polyester film constituting the laminated polyester film according to the present invention, there may also be used a simultaneous biaxial stretching method. The simultaneous biaxial stretching method is such a method in which the above unstretched sheet is stretched and oriented in both of the machine and width directions at the same time while maintaining the sheet in a suitable temperature-controlled condition at a temperature of usually 70 to 120° C. and preferably 80 to 110° C. The stretch ratio used in the simultaneous biaxial stretching method is 4 to 50 times, preferably 7 to 35 times and more preferably 10 to 25 times in terms of an area ratio of the sheet to be stretched. Successively, the obtained biaxially stretched sheet is heat-treated at a temperature of 170 to 250° C. under a tension or relaxation within 30% to obtain a stretched oriented film. As the apparatus used in the above simultaneous biaxial stretching method, there may be employed those stretching apparatuses of any conventionally known type such as a screw type stretching apparatus, a pantograph type stretching apparatus and a linear drive type stretching apparatus.

Next, the method of forming the coating layer constituting the laminated polyester film according to the present invention is explained. The coating layer may be formed either by an in-line coating method in which the surface of the polyester film is subjected to coating treatment during the stretching step of the polyester film, by an off-line coating method in which the polyester film produced is once transferred to an outside of the film production system and subjected to coating treatment, or by combination of these methods. Among these methods, the in-line coating method is preferably used because the coating layer can be produced simultaneously with formation of the polyester film and therefore at low costs, and the thickness of the coating layer can be varied by controlling a stretch ratio of the polyester film.

For example, in the case of a sequential biaxial stretching, the in-line coating treatment may be carried out, in particular, after completion of the longitudinal stretching but before initiation of the lateral stretching, although not particularly limited thereto. When the coating layer is formed on the polyester film by the in-line coating method, the coating can be carried out simultaneously with formation of the polyester film, and the coating layer can be treated at a high temperature. As a result, it is possible to produce a film suitable as the polyester film used in the present invention.

In the present invention, it is essentially required that a coating layer is formed on at least one surface of a polyester film by applying a coating solution comprising a urethane resin, an epoxy compound, an oxazoline compound and a melamine compound thereonto.

The coating layer used in the present invention is a coating layer capable of enhancing adhesion to, in particular, a solvent-free active energy ray-curable layer. On the coating layer, there may be formed, for example, a micro-lens layer or a prism layer.

As a result of various present inventors' earnest studies, it has been found that a coating layer formed by using a urethane resin in combination with a crosslinking agent such as an oxazoline compound or a melamine compound is enhanced in adhesion property to a prism layer or a micro-lens layer. As a result of further continuous studies, it has been found that a coating layer comprising a urethane resin, an epoxy compound and an oxazoline compound exhibits a very good adhesion property even when the amount of active energy rays irradiated is small (the processing speed is high). However, when subjected to wet heat treatment under more severe conditions, the coating layer tends to be deteriorated in adhesion property in some cases. In such a case, it has been found that when using the above components in combination with a melamine compound, the resulting coating layer can exhibit a stable adhesion property even after subjected to the wet heat treatment.

The urethane resin included in the coating layer of the film according to the present invention is a high-molecular compound having a urethane bond in a molecule thereof. The urethane resin is usually produced by the reaction between a polyol and an isocyanate. Examples of the polyol include polycarbonate polyols, polyester polyols, polyether polyols, polyolefin polyols and acrylic polyols. These compounds may be used alone or in combination of any two or more thereof.

The polycarbonate polyols may be obtained by subjecting a polyhydric alcohol and a carbonate compound to dealcoholization reaction. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexane dimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate polyols obtained by the reaction between the above compounds include poly(1,6-hexylene)carbonate and poly(3-methyl-1,5-pentylene)carbonate.

Examples of the polyester polyols include those produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol).

Examples of the polyether polyols include polyethylene glycol, polypropylene glycol, polyethylene/propylene glycol, polytetramethylene ether glycol and polyhexamethylene ether glycol.

In order to enhance adhesion to various overcoat layers, among the above polyols, preferred are polycarbonate polyols and polyester polyols.

Examples of a polyisocyanate compound used for producing the urethane resin include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as $\alpha,\alpha,\alpha',\alpha'$-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof.

When the urethane resin is synthesized, there may be used a chain extender. The chain extender is not particularly limited, and any chain extender may be used as long as it has two or more active groups capable of reacting with an isocyanate group. In general, there may be mainly used such a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidenecyclohexyl-4,4'-diamine, 1,4-diaminocyclohexane and 1,3-bisaminomethyl cyclohexane.

The urethane resin used in the present invention may be dispersed or dissolved in a solvent as a medium, and is preferably dispersed or dissolved in water as the medium. In order to disperse or dissolve the urethane resin in water, there may be used those urethane resins of a forcibly emulsifiable type which can be dispersed and dissolved using an emulsifier, or those urethane resins of a self-emulsifiable type or a water-soluble type which are obtained by introducing a hydrophilic group into urethane resins, etc. Among these urethane resins, in particular, self-emulsifiable type urethane resins which are ionomerized by introducing an ionic group into a skeleton of urethane resins are preferred because they are excellent in storage stability of the coating solution as well as water resistance, transparency and adhesion property of the resulting coating layer. Examples of the ionic group to be introduced into the urethane resins include various groups such as a carboxyl group, a sulfonic acid group, a phosphoric acid group, a phosphonic acid group and a quaternary ammonium salt group. Among these ionic groups, preferred is a carboxyl group. As the method of introducing a carboxyl group into the urethane resin, there may be used various methods which may be carried out in respective stages of the polymerization reaction. For example, there may be used the method in which a carboxyl group-containing resin is used as a comonomer component upon synthesis of a prepolymer, or the method in which a carboxyl group-containing component is used as one component of the polyol, the polyisocyanate, the chain extender and the like. In particular, there is preferably used the method in which a carboxyl group-containing diol is used to introduce a desired amount of a carboxyl group into the urethane resins by suitably adjusting an amount of the diol component charged. For example, the diol used in the polymerization for production of the urethane resin may be copolymerized with dimethylol propionic acid, dimethylol butanoic acid, bis-(2-hydroxyethyl)propionic acid, bis-(2-hydroxyethyl)butanoic acid, etc. In addition, the carboxyl group thus introduced is preferably formed into a salt thereof by neutralizing the carboxyl group with ammonia, amines, alkali metals, inorganic alkalis, etc. Among these compounds used for the neutralization, especially preferred are ammonia, trimethylamine and triethylamine. When using such a polyurethane resin, the carboxyl group thereof from which the neutralizing agent is removed in the drying step after the coating step may be used as a crosslinking reaction site which can be reacted with other crosslinking agents. As a result, the above-described urethane resin is excellent in stability when preserved in the form of a solution before being coated, and further the coating layer obtained therefrom can be further improved in durability, solvent resistance, water resistance, anti-blocking property, etc.

Further, the urethane resin which is used in the coating layer according to the present invention may be in the form of a compound having a double bond. The double bond serves for enhancing adhesion of the coating layer to a layer formed on the coating layer. In the case where the layer formed on the coating layer is a curable resin layer obtained by radical reaction of a double bond, the resin can also be reacted with a double bond being present in the coating layer, so that adhesion between both the layers can be more strengthened.

When introducing the double bond into the urethane resin having a polycarbonate structure, a vinyl group is preferably introduced thereinto in view of radical reactivity thereof. The vinyl group may be introduced into the urethane resin by various methods in the respective steps for production of the urethane resin. For example, there may be used the method in which a resin having a vinyl group is used as a comonomer component upon synthesis of a prepolymer of the urethane resin, or the method in which a vinyl group-containing diol, diamine or amino alcohol, etc., is used, if required, in the respective steps of the polymerization. More specifically, for example, a vinyl ether compound such as 2-hydroxyethyl vinyl ether, diethylene glycol monovinyl ether and 4-hydroxybutyl vinyl ether may be previously copolymerized with a part of the comonomer components.

The content of the vinyl group in the urethane resin is not particularly limited, and the vinyl group may be introduced into the urethane resin, for example, in an amount of not less than 1 mol per 100 mol of a urethane bond in the urethane resin. When it is intended to further enhance an adhesion property of the coating layer, the vinyl group may be used in an amount of not less than 5 mol. The upper limit of the amount of the vinyl group introduced is not particularly limited. However, even if an excess amount of the vinyl group is introduced, no further effect is attained by introduction of the vinyl group, and rather the resulting urethane resin tends to be deteriorated in mechanical properties. Therefore, the content of the vinyl group in the urethane resin is preferably not more than 50 mol and more preferably not more than 25 mol per 100 mol of the urethane bond.

Upon forming the coating layer of the film according to the present invention, for the purposes of increasing a coating film strength of the obtained coating layer, allowing the coating layer to exhibit a sufficient adhesion property to a micro-lens layer or a prism layer even when the amount of active energy rays irradiated is small, and enhancing a wet heat resistance, etc., of the film after forming the micro-lens layer or the prism layer on the coating layer, the coating layer may further comprise as a crosslinking agent, an epoxy compound, an oxazoline compound or a melamine compound.

Examples of the epoxy compound include compounds having an epoxy group in a molecule thereof, and prepolymers and cured products of the compounds. Examples of the epoxy compound include condensates of epichlorohydrin with a hydroxyl group of ethylene glycol, polyethylene glycol, glycerol, polyglycerol, bisphenol A, etc., or an amino group. Specific examples of the epoxy compound include polyepoxy compounds, diepoxy compounds, monoepoxy compounds and glycidyl amine compounds. Examples of the polyepoxy compounds include sorbitol, polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

In particular, among these epoxy compounds, preferred are polyfunctional epoxy compounds, and more preferred are polyfunctional epoxy compounds having at least two glycidyl ether structures. Examples of the commercially available products of the epoxy compounds include "DECONAL EX-521" (polyglycerol polyglycidyl ether) produced by Nagase Chemtex Co., Ltd., etc.

Examples of the oxazoline compound include those compounds having an oxazoline group in a molecule thereof. Especially preferred are polymers having an oxazoline group which may be in the form of a homopolymer of an addition-polymerizable oxazoline group-containing monomer or a copolymer of the addition-polymerizable oxazoline group-containing monomer with the other monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-methyl-2-oxazoline. These oxazoline compounds may be used alone or in the form of a mixture of any two or more thereof. Among these oxazoline compounds, 2-isopropenyl-2-oxazoline is more preferred because of industrial availability thereof. The other monomers used in the copolymer are not particularly limited as long as they are copolymerizable with the addition-polymerizable oxazoline group-containing monomer. Examples of the other monomers include (meth)acrylic acid esters such as alkyl(meth)acrylates (in which the alkyl group may be methyl, ethyl, n-propyl, isopropyl, n-butyl isobutyl, t-butyl, 2-ethylhexyl or cyclohexyl); unsaturated carboxylic acids such as acrylic acid, methacrylic acid, itaconic acid, maleic acid, fumaric acid, crotonic acid, styrenesulfonic acid and salts thereof (such as sodium salts, potassium salts, ammonium salts and tertiary amine salts); unsaturated nitriles such as acrylonitrile and methacrylonitrile; unsaturated amides such as (meth)acrylamide, N-alkyl(meth)acrylamide and N,N-dialkyl(meth)acrylamide (in which the alkyl group may be methyl, ethyl, n-propyl, isopropyl, n-butyl, isobutyl, t-butyl, 2-ethylhexyl or cyclohexyl); vinyl esters such as vinyl acetate and vinyl propionate; vinyl ethers such as methyl vinyl ether and ethyl vinyl ether; a-olefins such as ethylene and propylene; halogen-containing a,b-unsaturated monomers such as vinyl chloride, vinylidene chloride and vinyl fluoride; and α,β-unsaturated aromatic monomers such as styrene and a-methyl styrene. These other monomers may be used alone or in combination of any two or more thereof.

In particular, among these oxazoline compounds, preferred are those polymers having an oxazoline group on a side chain thereof. Such polymers may be readily obtained by polymerizing the addition-polymerizable oxazoline group-containing monomer with the other monomer. Examples of the commercial product of the oxazoline compound produced using an acrylic monomer as the other monomer include "EPOCROSS WS-500" (produced by Nippon Shokubai Co., Ltd.) as a polymer-type crosslinking agent in which an oxazoline group is bonded as a branched chain to an acrylic resin.

The melamine compounds are compounds having a melamine skeleton therein. Examples of the melamine compounds include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In addition, there may also be used those compounds obtained by co-condensing a urea or the like to a part of melamine. Further, a catalyst may also be used to enhance a reactivity of the melamine compound. In particular, among these melamine compounds, preferred are alkylated melamine compounds, and more preferred are completely alkylated melamine compounds. Examples of the completely alkylated melamine compounds include hexamethoxymethyl melamine.

Also, in order to improve a slipping property and anti-blocking property of the film, the coating layer preferably comprises particles as a constitutional component of the coating layer. The content of the particles in the coating layer is preferably in the range of 3 to 25% by weight, more preferably 5 to 15% by weight and still more preferably 5 to 10% by weight based on a total weight of the coating layer. When the content of the particles in the coating layer is less than 3% by weight, the effects of imparting a slipping property and preventing occurrence of blocking tends to be insufficient. On the other hand, when the content of the particles in the coating layer is more than 25% by weight, the resulting coating layer tends to be deteriorated in transparency as well as continuity, so that there tend to occur problems such as deteriorated coating film strength and poor easy-bonding property.

Examples of the particles used in the coating layer include inorganic particles such as silica, alumina and metal oxides, and organic particles such as crosslinked polymer particles. In particular, from the viewpoints of a good dispersibility in the coating layer and a good transparency of the resulting coating film, silica particles are preferably used.

In the coating layer according to the present invention, in order to improve surface properties of the coating layer and enhance a visibility when forming various layers such as a micro-lens layer and a prism layer on the surface of the coating layer as well as improve a transparency of the resulting film, a binder polymer other than the above urethane resin may be used in combination therewith.

The "binder polymer" used in the present invention is defined as a high-molecular compound having a number-average molecular weight (Mn) of not less than 1000 as measured by gel permeation chromatography (GPC) according to a flow scheme for evaluation of safety of high-molecular compounds (Council of Chemical Substances; November, 1985), and exhibiting a good film-forming property.

Specific examples of the binder polymer include polyester resins, acrylic resins, polyvinyl resins (such as polyvinyl alcohol, polyvinyl chloride and vinyl chloride-vinyl acetate copolymers), polyalkylene glycols, polyalkylene imines, methyl cellulose, hydroxy cellulose, starches, etc.

Further, the coating layer may also comprise various additives such as a defoaming agent, a coatability improver, a thickening agent, an organic lubricant, an antistatic agent, an ultraviolet absorber, an antioxidant, a foaming agent and a dye, if required, unless the subject matter of the present invention is adversely affected thereby.

In the present invention, the content of the above urethane resin in the coating layer is usually 20 to 90% by weight, preferably 30 to 85% by weight and more preferably 40 to 80% by weight. When the content of the urethane resin in the coating layer is less than 20% by weight, the resulting coating layer tends to be insufficient in adhesion property owing to the less content of the urethane resin component. When the content of the urethane resin in the coating layer is more than 90% by weight, the resulting coating layer tends to become brittle owing to the less content of the crosslinking agent component, and therefore tends to be insufficient in adhesion property or wet heat resistance.

In the present invention, the total content of the epoxy compound, the oxazoline compound and the melamine compound in the coating layer is usually 10 to 80% by weight, preferably 15 to 70% by weight and more preferably 20 to 60% by weight. When the total content of the epoxy compound, the oxazoline compound and the melamine compound in the coating layer is less than 10% by weight, the resulting coating layer tends to become brittle and therefore tends to be incapable of fully withstanding moisture and heat in environments. When the total content of the epoxy compound, the oxazoline compound and the melamine compound in the coating layer is more than 80% by weight, the resulting coating layer tends to be insufficient in adhesion property. In addition, the weight ratio between the epoxy compound, the oxazoline compound and the melamine compound in the coating layer is usually 1 to 40:1 to 40:1 to 30, and preferably 3 to 30:3 to 30:3 to 20.

The polyester film used in the present invention may also be provided, on its surface opposed to the surface on which the above coating layer is formed, with an additional coating layer. For examples, in the case where a functional layer such as an anti-sticking layer, a light diffusion layer and a hard coat layer is to be formed on the surface of the polyester film which is opposed to the surface on which the prism layer or micro-lens layer is formed, the coating layer formed on the opposite surface of the polyester film is capable of enhancing an adhesion property to the functional layer. The coating layer formed on the opposite surface of the polyester film may comprise conventionally known components, for example, a binder polymer such as polyester resins, acrylic resins and urethane resins, a crosslinking agent such as an epoxy compound, an oxazoline compound, a melamine compound and an isocyanate compound, etc. These components or materials may be used alone or in combination of any two or more thereof. In addition, the coating layer formed on the opposite surface of the polyester film may be the above coating layer formed from the urethane resin, the epoxy compound, the oxazoline compound and the melamine compound (i.e., the same coating layer may be formed on both side surfaces of the polyester film).

The analysis of the components contained in the coating layer may be conducted, for example, by surface analysis such as TOF-SIMS.

When forming the coating layer by in-line coating, the laminated polyester film is preferably produced by the method in which an aqueous solution or a water dispersion comprising a series of the above mentioned compounds is prepared as a coating solution having a concentration of about 0.1 to about 50% by weight in terms of a solid content thereof, and the thus prepared coating solution is applied onto the polyester film. The coating solution may also comprise a small amount of an organic solvent for the purpose of improving a dispersibility in water, a film-forming property, etc., unless the subject matter of the present invention is adversely affected thereby. The organic solvent may be used alone, or may be appropriately used in the form of a mixture of any two or more thereof.

In the laminated polyester film of the present invention, the film thickness of the coating layer formed on the polyester film is usually in the range of 0.002 to 1.0 $g/m^2$, preferably 0.005 to 0.5 $g/m^2$ and more preferably 0.01 to 0.2 $g/m^2$. When the film thickness of the coating layer is less than 0.002 $g/m^2$, the resulting coating layer may fail to exhibit a sufficient adhesion property. When the film thickness of the coating layer is more than 1.0 $g/m^2$, the resulting coating layer tends to be deteriorated in appearance and transparency, and the obtained laminated film tends to be deteriorated in anti-blocking property.

In the present invention, as the method of forming the coating layer, there may be used conventionally known coating methods such as a reverse gravure coating method, a direct gravure coating method, a roll coating method, a die coating method, a bar coating method and a curtain coating method which are described, for example, in Yuji HARAZAKI, "Coating Methods", Maki-shoten, 1979.

In the present invention, the drying and curing conditions used upon forming the coating layer on the polyester film are not particularly limited. For example, in the case where the coating layer is formed in an off-line coating manner, the coating layer may be subjected to heat treatment usually at a temperature of 80 to 200° C. for 3 to 40 sec and preferably at a temperature of 100 to 180° C. for 3 to 40 sec.

On the other hand, in the case where the coating layer is formed in an in-line coating manner, the coating layer may be subjected to heat treatment usually at a temperature of 70 to 280° C. for 3 to 200 sec.

In any of the off-line coating and in-line coating methods, the heat treatment may be used in combination with irradiation with active energy rays such as irradiation with ultraviolet rays, if required. The polyester film constituting the laminated polyester film of the present invention may be previously subjected to surface treatments such as corona treatment and plasma treatment.

The coating layer of the laminated polyester film according to the present invention is generally provided thereon with a prism layer or a micro-lens layer in order to improve a brightness of the film. In recent years, in order to efficiently enhance a brightness of films, there have been proposed prism layers of various shapes. In general, the prism layers have plural rows of prisms each having a triangular sectional shape which are arranged in parallel with each other. Also, there have been proposed micro-lens layers of various shapes. In general, the micro-lens layers have a structure in which a number of semispherical convex lenses are provided on a film. Both of the prism layer and the micro-lens layer may respectively have any conventionally known shapes.

The prism layer may have, for example, such a shape in which a thickness of the layer is 10 to 500 μm, rows of prisms have a pitch of 10 to 500 μm, and respective prisms have a triangular sectional shape having an apex angle of 40° to 100°. As the material of the prism layer, there may be used conventionally known materials. Examples of the material of the prism layer include active energy ray-curable resins, more specifically, polyester resins, epoxy resins, and (meth)acrylate-based resins such as polyester (meth)acrylates, epoxy (meth)acrylates and urethane (meth)acrylates.

The micro-lens layer may have, for example, such a shape in which a thickness of the layer is 10 to 500 μm, and respective lenses have a semispherical shape having a diameter of 10 to 500 μm. The shape of each lens of the micro-lens layer may also be a conical shape or a pyramidal shape. As the material of the micro-lens layer, conventionally known materials may be used therefor similarly to the prism layer. Examples of the material of the micro-lens layer include active energy ray-curable resins.

EXAMPLES

The present invention is described in more detail below by Examples. However, these Examples are only illustrative and not intended to limit the present invention thereto. In addition, the measuring and evaluating methods used in the present invention are as follows.

(1) Measurement of Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Measurement of Average Particle Diameter ($d_{50}$: μm):

Using a centrifugal precipitation type particle size distribution measuring apparatus "SA-CP3 Model" manufactured by Shimadzu Seisakusho Co., Ltd., the value of a particle size corresponding to a cumulative fraction of 50% (on the basis of weight) in equivalent spherical distribution of the particles was measured as an average particle diameter.

(3) Method for Evaluation of Adhesion Property 1:

A resin "KAYARAD DPHA-40H" as an active energy-curable resin composition produced by Nippon Kayaku Co., Ltd., was placed in a mold for forming a prism layer in which plural rows of prism-shaped mold cavities each having an apex angle of 65° were arranged with a pitch of 50 μm in parallel with each other. Then, the laminated polyester film was overlapped on the resin in the mold such that the coating layer of the laminated polyester film came into contact with the resin. The active energy ray-curable resin composition was uniformly spread using a roller, and then an ultraviolet ray was irradiated thereover using an ultraviolet irradiation apparatus "Mercury Lamp 80 W" with an intensity of 25 mJ/cm² to cure the resin. Next, the resulting film was released from the mold to obtain a laminated film on which the prism layer was formed. Immediately after obtaining the laminated film (initial test) and after dipping the film in boiled water for 10 min (hot water test), the surface of the laminated film was cut using a cutter knife to form flaws at intervals of 5 mm, and then a 24 mm-wide tape ("Cellotape (registered trademark) CT-24" produced by Nichiban Co., Ltd.) was attached onto the cut surface of the film, and then rapidly peeled off therefrom at a peel angle of 180°. Then, the surface of the laminated film from which the tape was peeled off was observed to measure an area of the layer peeled. The evaluation ratings are as follows.

A: Peeled area of the layer was not more than 5%.

B: Peeled area of the layer was more than 5% and not more than 20%.

C: Peeled area of the layer was more than 20% and not more than 50%.

D: Peeled area of the layer was more than 50%.

(4) Method for Evaluation of Adhesion Property 2:

The same procedure as defined in the above evaluation of adhesion property 1 was conducted except that the ultraviolet ray was irradiated using the "Mercury Lamp 80 W" with an increased intensity of 60 mJ/cm² to thereby evaluate an initial adhesion property of the coating layer.

The polyesters used in the respective Examples and Comparative Examples were prepared by the following methods.

<Method for Producing Polyester (A)>

One hundred parts by weight of dimethyl terephthalate and 60 parts by weight of ethylene glycol as starting materials were charged together with tetrabutoxytitanate as a catalyst into a reaction vessel, and the reaction therebetween was initiated at 150° C. The reaction temperature was gradually raised while distilling off methanol as produced, and allowed to reach 230° C. after 3 hr. After 4 hr, the transesterification reaction was substantially terminated, and then the resulting product was subjected to polycondensation reaction for 4 hr. More specifically, the reaction temperature was gradually raised from 230° C. until reaching 280° C. On the other hand, the reaction pressure was gradually reduced from normal pressures until finally reaching 0.3 mmHg. After initiation of the reaction, the change in agitation power in the reaction vessel was monitored, and the reaction was terminated at the time at which a viscosity of the reaction solution reached the value corresponding to an intrinsic viscosity of 0.63 on the basis of the change in agitation power in the reaction vessel. The resulting polymer was discharged under application of a nitrogen pressure from the reaction vessel, thereby obtaining a polyester (A) having an intrinsic viscosity of 0.63.

<Method for Producing Polyester (B)>

One hundred parts by weight of dimethyl terephthalate and 60 parts by weight of ethylene glycol as starting materials were charged together with magnesium acetate tetrahydrate as a catalyst into a reaction vessel, and the reaction therebetween was initiated at 150° C. The reaction temperature was gradually raised while distilling off methanol as produced, and allowed to reach 230° C. after 3 hr. After 4 hr, the transesterification reaction was substantially terminated. The obtained reaction mixture was transferred to a polycondensation reaction vessel, and mixed with orthophosphoric acid and then with germanium dioxide, followed by subjecting the resulting mixture to polycondensation reaction for 4 hr. More specifically, the reaction temperature was gradually raised from 230° C. until reaching 280° C. On the other hand, the reaction pressure was gradually reduced from normal pressure until finally reaching 0.3 mmHg. After initiation of the reaction, the change in agitation power in the reaction vessel was monitored, and the reaction was terminated at the time at which a viscosity of the reaction solution reached the value corresponding to an intrinsic viscosity of 0.65 on the basis of the change in agitation power in the reaction vessel. The resulting polymer was discharged under application of a nitrogen pressure from the reaction vessel, thereby obtaining a polyester (B) having an intrinsic viscosity of 0.65.

<Method for Producing Polyester (C)>

The same procedure as defined in the above method for producing the polyester (A) was conducted except that silica particles having an average particle diameter of 2.0 μm in the form of a dispersion in ethylene glycol were added in an amount of 0.2 part, and the reaction was terminated at the time at which a viscosity of the reaction solution reached the value corresponding to an intrinsic viscosity of 0.66, thereby obtaining a polyester (C) having an intrinsic viscosity of 0.66.

The compounds constituting the coating layer are as follows.

(Examples of Compounds)

Urethane Resin: (IA)

Water dispersion of a urethane resin which was obtained by neutralizing a prepolymer produced from 400 parts of a polycarbonate polyol having a number-average molecular weight of 2000 which was obtained from 1,6-hexanediol and diethyl carbonate, 10.4 parts of neopentyl glycol, 58.4 parts of isophorone diisocyanate and 74.3 parts of dimethylol butanoic acid with triethylamine, and then subjecting the neutralized product to chain extension reaction using isophorone diamine.

Urethane Resin: (IB)

Water dispersion of a urethane resin which was obtained by reacting a polyester polyol obtained from 45 parts of adipic 30 parts of hexamethylene glycol and 13 parts of neopentyl glycol with 12 part of hexamethylene diisocyanate.

Urethane Resin: (IC)

Water dispersion which was obtained by neutralizing a urethane resin produced from 80 parts of a polycarbonate polyol having a number-average molecular weight of 2000 which was obtained from 1,6-hexanediol and diethyl carbonate, 4 parts of polyethylene glycol having a number-average molecular weight of 400, 12 parts of methylene-bis(4-cyclohexyl isocyanate) and 4 parts of dimethylol butanoic acid, with triethylamine.

Epoxy Compound:

(II) Polyglycerol polyglycidyl ether "DENACOL EX-521" (produced by Nagase Chemtex Co., Ltd.)

Oxazoline Compound:

(III) Polymer-type crosslinking agent "EPOCROSS WS-500" (produced by Nippon Shokubai Co., Ltd.) in which an oxazoline group is bonded as a branched chain to an acrylic resin.

Melamine Compound:

(IV) Hexamethoxymethyl melamine

Particles:

(V) Silica sol having an average particle diameter of 65 nm

Example 1

A mixed raw material obtained by mixing the polyesters (A), (B) and (C) in amounts of 85%, 5% and 10%, respectively, as a raw material for outermost layers (surface layers), and a mixed raw material obtained by mixing the polyesters (A) and (B) in amounts of 95% and 5%, respectively, as a raw material for an intermediate layer, were respectively charged into two extruders, melted therein at 290° C., and then co-extruded therefrom on a cooling roll whose surface was controlled to a temperature of 40° C. to form a sheet having a two-kind/three-layer structure (surface layer/intermediate layer/surface layer), followed by cooling and solidifying the thus extruded sheet on the cooling roll, thereby obtaining an unstretched sheet. Next, the thus obtained unstretched sheet was stretched utilizing a difference between peripheral speeds of rolls at 85° C. and a stretch ratio of 3.4 times in a longitudinal direction thereof. Thereafter, a coating solution A1 shown in the below-mentioned Table 1 was applied on one surface of the thus obtained longitudinally stretched sheet, and a coating solution B1 shown in Table 1 was applied on the other surface of the sheet. Then, the resulting coated sheet was introduced into a tenter where the sheet was stretched at 120° C. and a stretch ratio of 4.0 times in a lateral direction thereof and then heat-treated at 225° C. Next, the obtained stretched sheet was relaxed by 2% in a lateral direction thereof, thereby obtaining a polyester film having a thickness of 188 μm (each surface layer: 9 μm; intermediate layer: 170 μm) which was provided on both the surfaces thereof with respective coating layers each having a coating amount (after dried) as shown in Table 2.

As a result of evaluating an adhesion property of the thus obtained polyester film, it was confirmed that both of the first coating layer and the second coating layer exhibited a good adhesion property. The properties of the polyester film are shown in Table 2.

Examples 2 to 11

The same procedure as defined in Example 1 was conducted except that the coating agent composition was changed to those shown in Table 1, thereby obtaining polyester films. The properties of the thus obtained polyester films are shown in Table 2. As a result, it was confirmed that the coating layer in the respective polyester films exhibited a good adhesion property.

Comparative Examples 1 to 7

The same procedure as defined in Example 1 was conducted except that the coating agent composition was changed to those shown in Table 1, thereby obtaining polyester films. The evaluation results of the thus obtained laminated polyester films are as shown in Table 2, namely, it was confirmed that the coating layers in the respective polyester films had a low adhesion property.

TABLE 1

| Coating | Coating agent composition (wt %) | | | | | | |
|---|---|---|---|---|---|---|---|
| solutions | IA | IB | IC | II | III | IV | V |
| Coating solution 1 | 60 | 0 | 0 | 15 | 10 | 10 | 5 |
| Coating solution 2 | 0 | 60 | 0 | 15 | 10 | 10 | 5 |
| Coating solution 3 | 0 | 60 | 0 | 10 | 20 | 5 | 5 |
| Coating solution 4 | 0 | 0 | 60 | 15 | 10 | 10 | 5 |
| Coating solution 5 | 0 | 0 | 45 | 25 | 20 | 5 | 5 |
| Coating solution 6 | 0 | 0 | 75 | 10 | 5 | 5 | 5 |
| Coating solution 7 | 0 | 0 | 60 | 10 | 20 | 5 | 5 |
| Coating solution 8 | 0 | 0 | 60 | 20 | 10 | 5 | 5 |
| Coating solution 9 | 0 | 0 | 95 | 0 | 0 | 0 | 5 |
| Coating solution 10 | 0 | 0 | 60 | 35 | 0 | 0 | 5 |
| Coating solution 11 | 0 | 0 | 60 | 0 | 35 | 0 | 5 |
| Coating solution 12 | 0 | 0 | 60 | 0 | 0 | 35 | 5 |
| Coating solution 13 | 60 | 0 | 0 | 25 | 10 | 0 | 5 |
| Coating solution 14 | 0 | 60 | 0 | 10 | 25 | 0 | 5 |
| Coating solution 15 | 0 | 0 | 60 | 10 | 25 | 0 | 5 |

TABLE 2

| Examples and Comp. Examples | Coating solution | Coating amount (g/m²) | Initial adhesion property 1 |
|---|---|---|---|
| Example 1 | 1 | 0.03 | A |
| Example 2 | 2 | 0.03 | A |
| Example 3 | 3 | 0.06 | A |
| Example 4 | 4 | 0.03 | A |
| Example 5 | 4 | 0.06 | A |
| Example 6 | 4 | 0.08 | A |
| Example 7 | 4 | 0.12 | A |

TABLE 2-continued

| | | | |
|---|---|---|---|
| Example 8 | 5 | 0.08 | A |
| Example 9 | 6 | 0.06 | A |
| Example 10 | 7 | 0.03 | A |
| Example 11 | 8 | 0.06 | A |
| Comp. Example 1 | 9 | 0.03 | D |
| Comp. Example 2 | 10 | 0.08 | D |
| Comp. Example 3 | 11 | 0.08 | D |
| Comp. Example 4 | 12 | 0.08 | D |
| Comp. Example 5 | 13 | 0.08 | B |
| Comp. Example 6 | 14 | 0.03 | A |
| Comp. Example 7 | 15 | 0.08 | A |

| Examples and Comp. Examples | Adhesion property 1 after hot water test | Initial adhesion property 2 |
|---|---|---|
| Example 1 | A | A |
| Example 2 | A | A |
| Example 3 | A | A |
| Example 4 | A | A |
| Example 5 | A | A |
| Example 6 | A | A |
| Example 7 | A | A |
| Example 8 | A | A |
| Example 9 | A | A |
| Example 10 | A | A |
| Example 11 | A | A |
| Comp. Example 1 | D | D |
| Comp. Example 2 | D | D |
| Comp. Example 3 | D | C |
| Comp. Example 4 | D | C |
| Comp. Example 5 | C | A |
| Comp. Example 6 | C | A |
| Comp. Example 7 | C | A |

INDUSTRIAL APPLICABILITY

The film of the present invention can be suitably used in the applications in which a good adhesion property to a micro-lens layer or a prism layer is required, such as, for example, a backlight unit for liquid crystal displays.

The invention claimed is:

1. A laminated polyester film comprising
   a polyester film,
   a coating layer formed on at least one surface of the polyester film by applying a coating solution consisting of a urethane resin, an epoxy compound, an oxazoline compound and a melamine compound thereonto, and
   a prism layer or a micro-lens layer formed directly on the coating layer,
   wherein a content of the urethane resin in the coating layer is 20 to 90% by weight, a total content of the epoxy compound, the oxazoline compound and the melamine compound in the coating layer is 10 to 80% by weight, and the urethane resin is a self-emulsifiable urethane resin which is ionomerized by introducing a carboxyl group into a skeleton of the urethane resin and is obtained by using a polycarbonate polyol or a polyester polyol as a polyol.

2. A laminated polyester film according to claim 1, wherein the epoxy compound is a compound having an epoxy group in a molecule thereof, and prepolymer and cured product of the compound.

3. A laminated polyester film according to claim 2, wherein the epoxy compound is a condensate of epichlorohydrin with a hydroxyl group of ethylene glycol, polyethylene glycol, glycerol, polyglycerol, bisphenol A, or an amino group.

4. A laminated polyester film according to claim 3, wherein the epoxy compound is a polyglycerol polyglycidyl ether.

5. A laminated polyester film according to claim 1, wherein the oxazoline compound is a polymer having an oxazoline group.

6. A laminated polyester film according to claim 5, wherein the polymer having an oxazoline group is obtained by polymerizing an addition-polymerizable oxazoline group-containing monomer with other monomer.

7. A laminated polyester film according to claim 6, wherein the other monomer is a (meth)acrylic acid ester, an unsaturated carboxylic acid, an unsaturated nitrile, an unsaturated amide, a vinyl ester, a vinyl ether, α-olefin, a halogen-containing α,β-unsaturated monomer, an α,β-unsaturated aromatic monomer or mixture thereof.

8. A laminated polyester film according to claim 1, wherein the melamine compound has a melamine skeleton.

9. A laminated polyester film according to claim 8, wherein the melamine compound is an alkylolated melamine derivative, partially or completely etherified compound obtained by reacting the alkylolated melamine derivative with an alcohol, and a mixture of these compounds.

10. A laminated polyester film according to claim 9, wherein the melamine compound is hexamethoxymethyl melamine.

11. A laminated polyester film comprising
    (1) a polyester film,
    (2) a coating layer formed on at least one surface of the polyester film by applying to the polyester film a coating solution consisting of a urethane resin, an epoxy compound, an oxazoline compound, a melamine compound, and
    (3) a prism layer or a micro-lens layer formed directly on the coating layer,
    particles, at least one additive selected from the group consisting of a defoaming agent, a coatability improver, a thickening agent, an organic lubricant, an antistatic agent, an ultraviolet absorber, an antioxidant, a foaming agent and a dye, and at least one binder polymer selected from the group consisting of an acrylic resin, polyvinyl resin, polyalkylene glycol, polyalkylene imines, methyl cellulose, hydroxy cellulose and starch, or mixture thereof, and
    wherein a content of the urethane resin in the coating layer is 20 to 90% by weight, a total content of the epoxy compound, the oxazoline compound and the melamine compound in the coating layer is 10 to 80% by weight, and the urethane resin is a self-emulsifiable urethane resin which is ionomerized by introducing a carboxyl group into a skeleton of the urethane resin and is obtained by using a polycarbonate polyol or a polyester polyol as a polyol.

12. A laminated polyester film according to claim 11, wherein the epoxy compound is a compound having an epoxy group in a molecule thereof, and prepolymer and cured product of the compound.

13. A laminated polyester film according to claim 12, wherein the epoxy compound is a condensate of epichlorohydrin with a hydroxyl group of ethylene glycol, polyethylene glycol, glycerol, polyglycerol, bisphenol A, or an amino group.

14. A laminated polyester film according to claim 13, wherein the epoxy compound is a polyglycerol polyglycidyl ether.

15. A laminated polyester film according to claim 11, wherein the oxazoline compound is a polymer having an oxazoline group.

16. A laminated polyester film according to claim 15, wherein the polymer having an oxazoline group is obtained by polymerizing an addition-polymerizable oxazoline group-containing monomer with other monomer.

17. A laminated polyester film according to claim 16, wherein the other monomer is a (meth)acrylic acid ester, an unsaturated carboxylic acid, an unsaturated nitrile, an unsaturated amide, a vinyl ester, a vinyl ether, α-olefin, a halogen-containing α,β-unsaturated monomer, an α,β-unsaturated aromatic monomer or mixture thereof.

18. A laminated polyester film according to claim 11, wherein the melamine compound has a melamine skeleton.

19. A laminated polyester film according to claim 18, wherein the melamine compound is an alkylolated melamine derivative, partially or completely etherified compound obtained by reacting the alkylolated melamine derivative with an alcohol, and a mixture of these compounds.

20. A laminated polyester film according to claim 19, wherein the melamine compound is hexamethoxymethyl melamine.

* * * * *